March 6, 1951     C. B. WALWORTH, JR     2,543,816

SHADED POLE MOTOR

Original Filed Aug. 18, 1945

Inventor
Clarence B. Walworth Jr.
by Roberts, Cushman & Grover
Att'ys

Patented Mar. 6, 1951

2,543,816

UNITED STATES PATENT OFFICE 2,543,816

SHADED POLE MOTOR

Clarence B. Walworth, Jr., Rocky Hill, Conn.

Original application August 18, 1945, Serial No. 611,276, now Patent No. 2,445,813, dated July 27, 1948. Divided and this application July 14, 1948, Serial No. 38,583

4 Claims. (Cl. 172—278)

This invention pertains to electric motors, particularly to reaction type synchronous motors such as are employed, for example, for driving clock or relay mechanisms. The present application is a division of my copending application Serial Number 611,276, filed August 18, 1945, now Patent No. 2,445,813 dated July 27, 1948.

The principal object of the present invention is to provide a motor of this type which is of very simple construction employing a minimum number of parts and which may be made in very small sizes if desired, but which is rugged and durable, has good starting characteristics and is capable of delivering a high torque. A further object is to provide a motor of this type most of whose parts may be made from sheet material by simple stamping or die press operations, which may readily be assembled without requiring high skill, and which may be provided with shading coils of a simple and highly effective construction. Still another object is to provide such a motor which has favorable operating conditions due to a peculiar correlation of the pole elements of the energizing member and a shading coil.

These and other objects and advantages will be pointed out in the following more detailed description of several embodiments illustrating the characteristic features of the invention with reference to the accompanying drawings, wherein Fig. 1 is a diametrical section through one embodiment of the invention;

Figure 1:
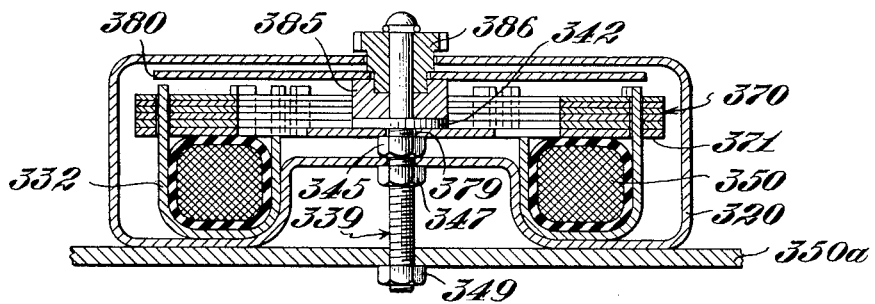
Figure 2:
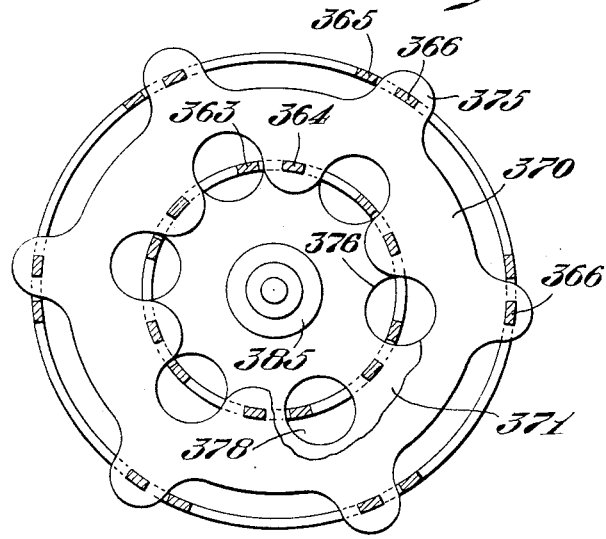
Fig. 2 is a top view of the motor according to Figs. 1 and 3 with the rotor removed and part of the upper shading members broken away.
Figure 3:
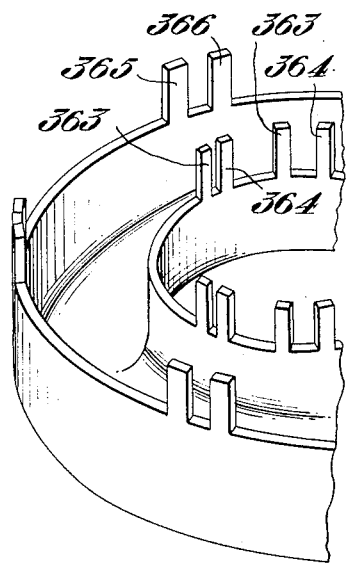
Fig. 3 is a fragmentary isometric view of the stator shell according to Fig. 1.

As shown in Figs. 1 and 2, the stator element of one embodiment, which is included in the subject matter of the present divisional application, consists of a single stamping 332. As particularly indicated in Fig. 3, the pole teeth extend upwardly from the two concentric edges of the half-doughnut shaped stator body, such that pairs of outer pole teeth 365, 366, are placed symmetrically to the direction of the radii extending halfway between inner pole teeth pairs, 363, 364. The stator body is closed, and the magnet coil 350 kept in place, by shading disks 370 which, with the exception of the lowest disk 371, have an annular shape with projections 375, 376 (Fig. 2) extending outwardly and inwardly, respectively. The pole teeth 366 and 364 respectively, are shaded, whereas teeth 363 and 365 are electrically not affected.

As indicated in Fig. 2, the lowest shading disk 371 has circular openings 378 which perform the function of the corresponding recesses of the upper shading disk, and a central opening 379 (Fig. 1) for the mounting shaft 339. The disk 342 supports the bearing block 385 which may again comprise a ball bearing or be made of porous oil-saturated metal, and which is fastened to disk 371 by means of a nut 345, as indicated in Fig. 1.

The rotor construction shown in Fig. 1 is similar to the embodiment shown in Fig. 1 in my Patent No. 2,445,813, with the difference that the rotor proper is in this case a plane disk 380, fastened to bearing block 385 by means of press fitted gear block 386. The entire motor assembly may be fastened to the supporting structure 350a by means of bolt extension 339 and nut 349.

The magnetic flux again surrounds coil 350, closing through the teeth and the peripheral portion of rotor disk 380.

Figure 4:
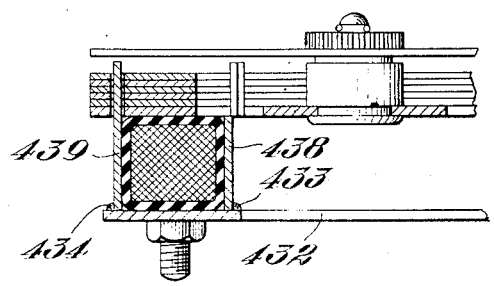
Fig. 4 is a fragmentary radial section of an additional embodiment of the invention.

A further embodiment of the present invention is indicated in Fig. 4. This construction is rather similar to that described above with reference to Figs. 1 to 3, with the exception that, instead of being pressed from a single sheet, the stator structure consists of a flat disk 432, to which are welded at 433 and 434 two cylindrical teeth-carrying rings 438 and 439.

It should be understood that the present disclosure is for the purpose of illustration only and that this invention includes all modifications and equivalents which fall within the scope of the appended claims.

I claim:

1. An electric motor of the type described comprising a substantially circular hollow half-toroid shaped motor body forming an annular groove with two concentric toothed edge portions, conductor means shading alternate teeth of said edge portions, an energizing coil held in said groove by said conductor means, a second substantially circular disk-shaped motor body, and means for mounting said second body on said first body for concentric rotation relatively thereto, the peripheral portion of said second body bridging said edge portions of said first body.

2. An electric motor of the type described comprising a sheet steel body in the shape of an annular groove with edge portions extending substantially cylindrically from said groove, pole teeth formed integrally with said edge portions in pairs angularly alternating on said edge portions, shading means engaging said teeth with alternate teeth being wholly surrounded by said shading means, and an energizing coil confined in said groove.

3. An electric motor of the type described comprising a sheet steel body in the shape of a substantially U-shaped annular groove, with edge portions extending substantially cylindrically from said groove, pole teeth formed integrally with said edge portions in pairs angularly alternating on said edge portions, shading plate means engaging said teeth with alternate teeth being wholly surrounded and hence magnetically affected and incompletely surrounded and hence magnetically unaffected, respectively, by said shading means, an energizing coil confined in said groove, a bearing fixed to said shading means in the axis of said groove, and a rotor disk rotatably mounted on said bearing with its peripheral region bridging said teeth.

4. An electric motor according to claim 3, wherein said bearing comprises a shaft column penetrating said shading means and having means for fastening the motor to a support.

CLARENCE B. WALWORTH, Jr.

REFERENCES CITED

The following references are of record in the file of this patent:

FOREIGN PATENTS

| Number | Country | Date |
|---|---|---|
| 391,565 | Great Britain | May 4, 1933 |
| 415,168 | Great Britain | Aug. 23, 1934 |
| 581,378 | Germany | July 26, 1933 |
| 623,239 | Germany | Dec. 20, 1935 |